(12) United States Patent
Ciereszko et al.

(10) Patent No.: US 10,685,170 B2
(45) Date of Patent: Jun. 16, 2020

(54) DYNAMIC CONTENT LAYOUT GENERATOR

(71) Applicant: Microsoft Technology Licensing, LLC, Redmond, WA (US)

(72) Inventors: Jacek Ciereszko, Bellevue, WA (US); Srinivas Patnaik, Bothell, WA (US); Steven Shaw, Bellevue, WA (US); Hillary Mutisya, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 294 days.

(21) Appl. No.: 14/971,962

(22) Filed: Dec. 16, 2015

(65) Prior Publication Data

US 2017/0177547 A1     Jun. 22, 2017

(51) Int. Cl.
*G06F 40/106* (2020.01)
*G06F 3/0481* (2013.01)
*G06F 40/131* (2020.01)

(52) U.S. Cl.
CPC .......... *G06F 40/106* (2020.01); *G06F 3/0481* (2013.01); *G06F 40/131* (2020.01)

(58) Field of Classification Search
CPC ..................................................... G06F 17/21
See application file for complete search history.

(56) References Cited

U.S. PATENT DOCUMENTS

| | | | |
|---|---|---|---|
| 5,796,401 A | 8/1998 | Winer | |
| 6,950,993 B2 | 9/2005 | Breinberg | |
| 7,765,470 B2 | 7/2010 | Epstein | |
| 8,082,497 B2 | 12/2011 | Salesin et al. | |
| 8,527,907 B2 | 9/2013 | Goshey | |
| 2006/0015520 A1* | 1/2006 | Lahtiranta et al. | G06F 17/00 |
| 2006/0031760 A1 | 2/2006 | Jacobs | |
| 2006/0048052 A1* | 3/2006 | Lehenbauer | G06F 9/4443 715/243 |
| 2007/0180362 A1 | 8/2007 | Hunt et al. | |
| 2007/0234233 A1* | 10/2007 | Chang | G06F 17/5068 715/815 |

(Continued)

OTHER PUBLICATIONS

Schrier et al., "Adaptive Layout for Dynamically Aggregated Documents", 2008, ACM, pp. 99-108.*

(Continued)

*Primary Examiner* — James J Debrow
(74) *Attorney, Agent, or Firm* — Alleman Hall Creasman & Tuttle LLP

(57) ABSTRACT

In one embodiment, a content aggregation viewer may present a container layout to summarize a data item set to a user. The content aggregation viewer may determine a viewport dimension for a viewport of a user interface of a content aggregation application to present a data item set to a user. The content aggregation viewer may automatically arrange a container set summarizing the data item set in a container layout based on the viewport dimension. The content aggregation viewer may set a parallel container dimension of a data item container of the container set having a variable dimension size in a direction of the viewport dimension based on the viewport dimension. The content aggregation viewer may present the container set in the container layout to the user.

20 Claims, 10 Drawing Sheets

(56) References Cited

U.S. PATENT DOCUMENTS

| | | |
|---|---|---|
| 2010/0017704 A1 | 1/2010 | Jaffe et al. |
| 2010/0095240 A1* | 4/2010 | Shiplacoff et al. ..... G06F 3/048 |
| 2012/0110437 A1 | 5/2012 | Pan et al. |
| 2013/0031470 A1 | 1/2013 | Daly, Jr. et al. |
| 2013/0219263 A1* | 8/2013 | Abrahami ............. G06F 17/211 |
| | | 715/234 |
| 2014/0055495 A1 | 2/2014 | Kim et al. |
| 2014/0129910 A1 | 5/2014 | Kota et al. |
| 2014/0181646 A1 | 6/2014 | Rangwala et al. |
| 2014/0258849 A1* | 9/2014 | Chung ................. G06F 17/212 |
| | | 715/243 |
| 2014/0281928 A1 | 9/2014 | Tkach et al. |
| 2014/0289640 A1 | 9/2014 | Poornachandran et al. |
| 2015/0007064 A1 | 1/2015 | Givoni |

OTHER PUBLICATIONS

Feuerstack, et al., "Model-based Layout Generation", In Proceedings of Working Conference on Advanced Visual Interfaces, May 28, 2008, pp. 217-224.

"Dynamic 1 Column Layout Generator", Retrieved at: <<http://www.pagecolumn.com/1_col_generator.htm>>, Jun. 17, 2008, 1 page.

"Column CSS Layout Generator", Retrieved at: <<http://www.pagecolumn.com/3_col_generator.htm>>, Jan. 19, 2009, 2 pages.

\* cited by examiner

*800*

US 10,685,170 B2

DYNAMIC CONTENT LAYOUT GENERATOR

BACKGROUND

A content aggregation viewer may harvest one or more pieces of digital content from one or more content sources. Digital content may be text, an image, an audio file, a video file, a web page, or a combination of various forms of media. The content sources may be a website, a server, or even a local storage drive. The content aggregation viewer may present the digital content, or links to the digital content, to the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to presenting a container layout to summarize a data item set to a user. The content aggregation viewer may determine a viewport dimension for a viewport of a user interface of a content aggregation application to present a data item set to a user. The content aggregation viewer may automatically arrange a container set summarizing the data item set in a container layout based on the viewport dimension. The content aggregation viewer may set a parallel container dimension of a data item container of the container set having a variable dimension size in a direction of the viewport dimension based on the viewport dimension. The content aggregation viewer may present the container set in the container layout to the user.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
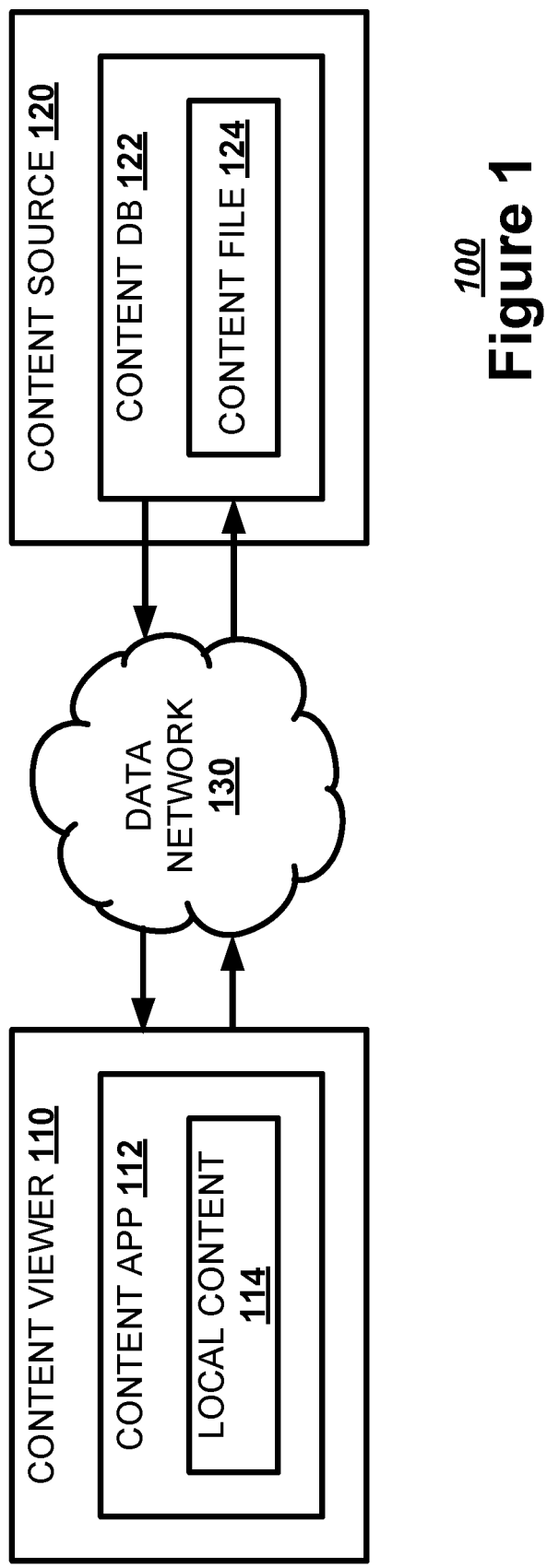
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a content aggregation viewer, a computing device, or a machine-implemented method.

In one embodiment, a content aggregation viewer may execute a content aggregation application to present a container layout to summarize a data item set to a user. The content aggregation viewer may determine a viewport dimension for a viewport of a user interface of a content aggregation application to present a data item set to a user. The content aggregation viewer may automatically arrange a container set summarizing the data item set in a container layout based on the viewport dimension. The content aggregation viewer may set a parallel container dimension of a data item container of the container set having a variable dimension size in a direction of the viewport dimension based on the viewport dimension. The content aggregation viewer may present the container set in the container layout to the user.

A content aggregation application may layout aggregated content in a responsive environment allowing users to resize a viewport to practically any size. A viewport represents the visible area of a graphical user interface of a content aggregation application. Additionally, a content aggregation application may execute on the same platform across multiple form factors, such as a smart phone, a tablet, a laptop, or a desktop. Furthermore, between different applications and structures, content layout may be structured for news with a formal environment versus entertainment or sports with a flexible layout with the focus more on images rather than text scanning. Traditionally, to accommodate different scenarios, content creators created various templates for the different scenarios and layouts. These templates may result in large maintenance costs to create and adjust templates with different design changes and scenarios.

A dynamic content layout generator may respond to the size of any viewport size to generate both a structured look and a variable look without creating custom layout templates for every scenario. The dynamic content layout generator may present a summary of an item of content using a data item container. The user may select the data item container to view the complete data item of content. The dynamic content layout generator may use a set of general content container sizes and input parameters on viewport height. The dynamic content layout generator may calculate the size of the viewport and dynamically select a mix of container sizes to ensure contents are aligned appropriately.

A content aggregation application may generate an adaptive layout based on the viewport size to determine a number of container lines to present to a user. A container line may be a row or a column of data item containers. The layout is responsive to user adjustment of viewport size. The content aggregation application may consider a viewport height minima or maxima to determine whether to produce a more structured look or more variable look. With few inputs, the content aggregation application may generate a random content layout that fits the viewport and also ensures the layout has a flushed bottom. The content aggregation application may have an equal or equivalent number of elements in each page of containers to ensure that the content layout is flushed at the bottom. A page is the subset of containers visible in the viewport at any one time. A page area may be determined based upon the dimensions of the viewport. The content aggregation application may stack pages to create infinite scrolling and data virtualization. Therefore, the layout may change dynamically while maintaining a consistent item count. The content aggregation application may use a specific input parameter for the first line, referred to as the hero container line, such as an exact pattern. The content aggregation application may use a hero container line to draw the focus of a user to specific containers. The content aggregation application may randomly generate and populate the remaining blank spaces with the rest of the content allocated to the page to achieve a flush bottom for stacking.

FIG. 1 illustrates, in a block diagram, one example of a data network 100. A user may use a client device to act as a content aggregation viewer 110 to harvest content from a variety of sources. The content aggregation viewer 110 may be a personal computer, a laptop, a tablet, a mobile phone, a game console, a smart watch, or other computing device used by the user to execute a content aggregation application (APP) 112. The content aggregation viewer 110 may access a local content item 114 from a local data storage. The content aggregation viewer may harvest content from a network content source 120, such as a video file server, an audio file server, or a news publisher, via a data network connection 130. The network content source 120 may have a content database (DB) 122 storing a network content file 124. The streaming application server 120 may be implemented on a single server or a distributed set of servers, such as a server farm. The data network connection 130 may be an internet connection, a wide area network connection, a local area network connection, or other type of data network connection.

Figure 2:
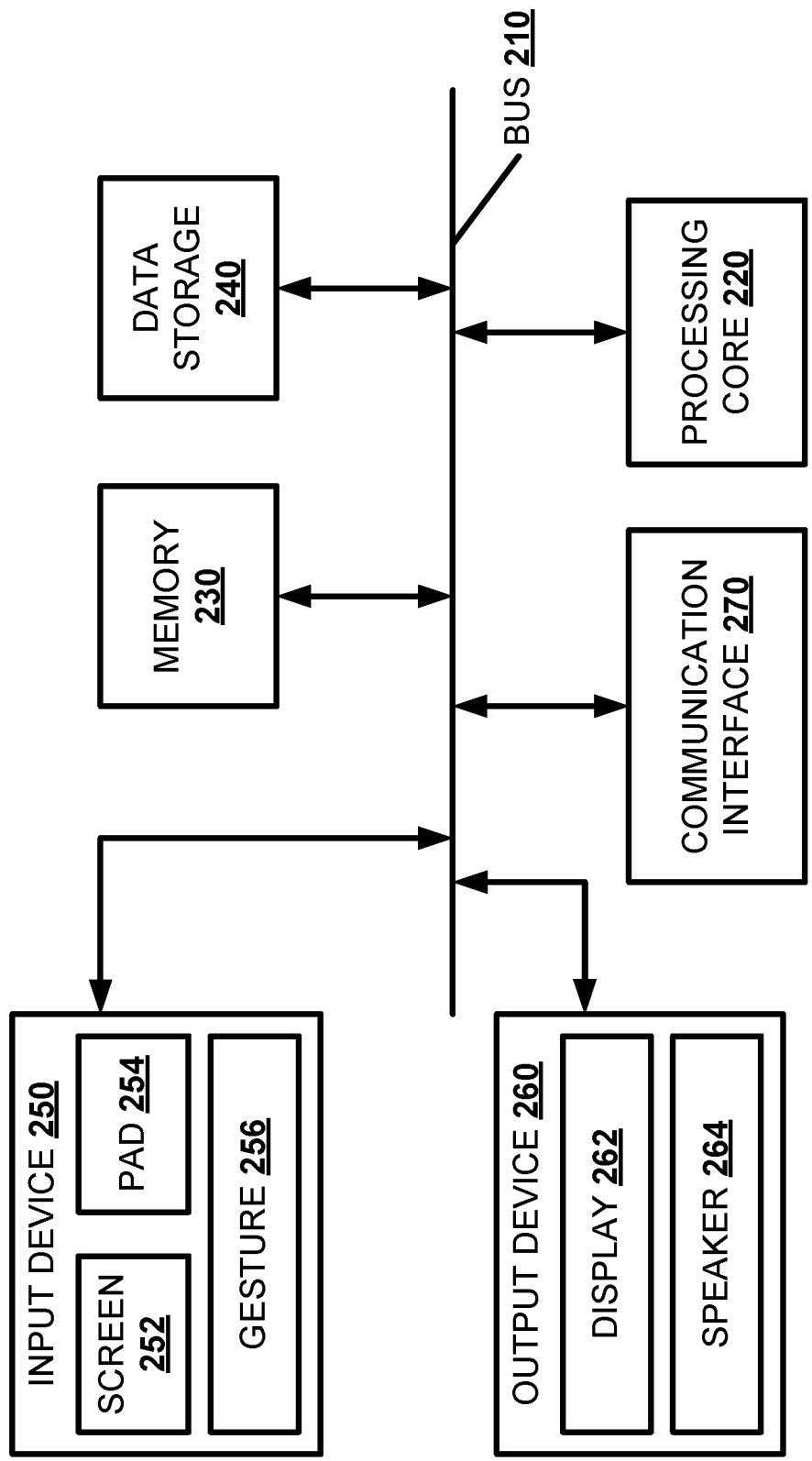
FIG. 2 illustrates, in a block diagram, one embodiment of a computing device.

FIG. 2 illustrates a block diagram of an exemplary computing device 200 which may act as a content aggregation viewer. The computing device 200 may combine one or more of hardware, software, firmware, and system-on-a-chip technology to implement a content aggregation viewer. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to determine a viewport dimension for viewport of a user interface of a content aggregation application to present a data item set to a user. The processing core 220 may be configured to automatically arrange a container set summarizing the data item set in a container layout based on the viewport dimension. The processing core 220 may be configured to set a container line quantity based on the viewport dimension. The processing core 220 may be configured to set a fixed container quantity for a parallel container line of the container set matching a direction of the viewport dimension. The processing core 220 may be configured to create a hero container line in the container layout having fewer data item containers than subsequent container lines in the container layout. The processing core 220 may be configured to vary a media presentation for members of the container set.

The processing core 220 may be configured to set a parallel container dimension of a data item container of the container set having a variable dimension size in a direction of the viewport dimension based on the viewport dimension. The processing core 220 may be configured to vary a member parallel container dimension in the direction of the viewport dimension for members of the container set within a parallel container line in the direction of the viewport dimension. The processing core 220 may be configured to vary a perpendicular container dimension orthogonal to the direction of the viewport dimension for members of the container set. The processing core 220 may be configured to select a media presentation for the data item container based on a perpendicular container dimension of the data item container orthogonal to the direction of the viewport dimension.

The processing core 220 may be configured to apportion an equal or equivalent page area for a visible page representing visible members of the container set present in the viewport and an on-deck page representing on-deck members of the container set about to be present in the viewport. The processing core 220 may be configured to arrange a visible page representing visible members of the container set present in the viewport into a visible container layout based on the viewport dimension. The processing core 220 may be configured to arrange an on-deck page representing on-deck members of the container set about to be present in the viewport into an on-deck container layout based on the viewport dimension.

The memory 230 may be a random access memory (RAM) or another type of dynamic data storage that stores information and instructions for execution by the processor 220. The memory 230 may also store temporary variables or other intermediate information used during execution of instructions by the processor 220. The memory may store a series of instructions to execute a content aggregation application having a user interface to present a data item set to a user. The memory 220 may be configured to cache the container layout prior to viewing a data item represented by a selected data item container.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing data items.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. An input device 250 may be configured to receive an adjustment of the viewport dimension for the viewport causing the processing core to rearrange the container set into a subsequent container layout based on the adjustment.

The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. A display 262 may be configured to present the container set in the container layout to the user. The display may be configured to transition an on-deck page representing on-deck members of the container set about to be present in the viewport to a visible position.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
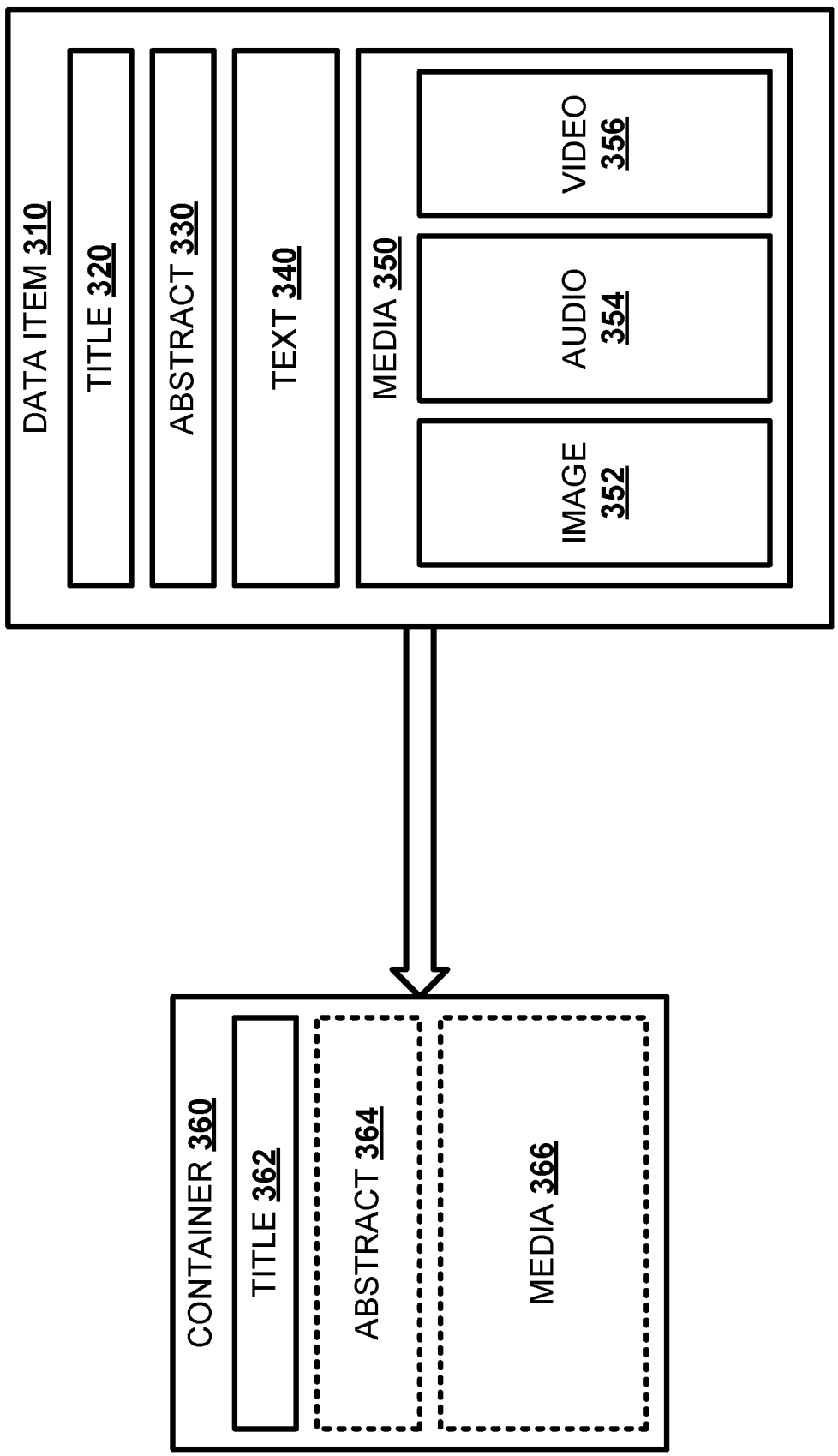
FIG. 3 illustrates, in a block diagram, one embodiment of generating a data item container.

FIG. 3 illustrates, in a block diagram, one embodiment of generation 300 of a data item container. A content aggregation viewer may present a data item 310 of content to a user. A data item 310 may be a file or other digital object containing content of one or more media types that may be presented to a user. The data item 310 may have an item title 320 labeling the data item 310. The data item 310 may have an item abstract 330 summarizing the contents of the data item 310 in textual form. The data item 310 may have an item text 340 to be presented in textual form to the user. The data item 310 may have one or more item media objects 350 to be presented to the user. The item media object 350 may be an image object 352, an audio object 354, and a video object 356.

The content aggregation viewer may convert the data item 310 into a data item container 360 to summarize the data item 310 for a user. The data item container 360 may have a container title 362 referencing the item title 320. The media presentation, describing the amount of detail in a data item container, may vary in richness of present content between members in a container set. For example, the data item container 360 may also have a container abstract 364 referencing the item abstract 330. Further, the data item container 360 may have a container media object 366 representing at least one of the item media objects 350 in the data item 310. The user may then select a data item container 360 to view the full data item 310.

Figure 4:
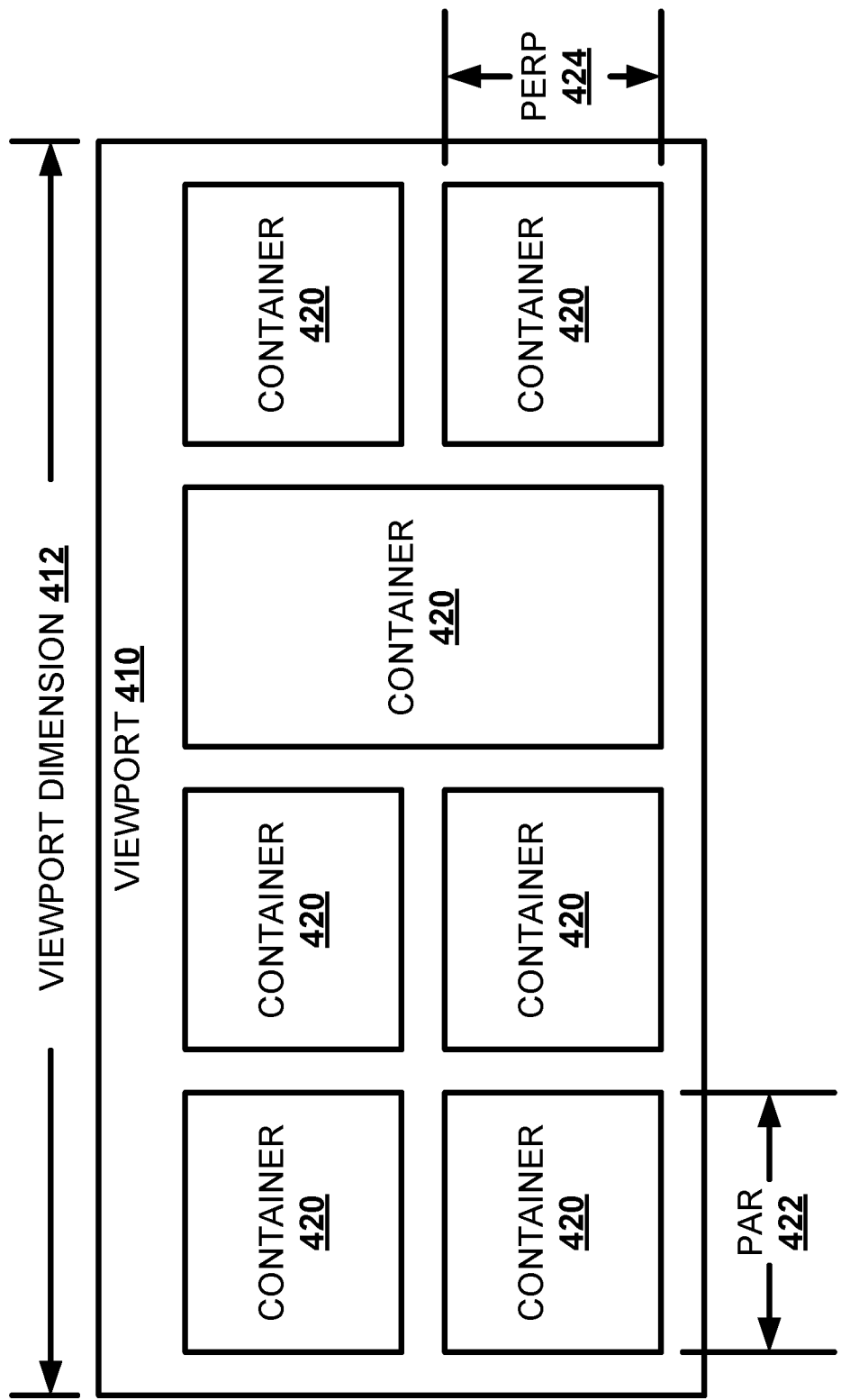
FIG. 4 illustrates, in a block diagram, one embodiment of a user interface of a content aggregation application.

FIG. 4 illustrates, in a block diagram, one embodiment of a user interface 400 of a content aggregation application. The user interface 400 may have a viewport 410 encompassing the area of the user interface 400 visible to the user on the display. The viewport 410 may have a viewport dimension 412 describing a measured length of the viewport 410. The viewport dimension 412 may be a vertical dimension or a horizontal dimension. The viewport dimension 412 may have an upper bound set by the size of the display presenting the user interface 400. The viewport dimension 412 may change based on a user input resizing the viewport 410 or, for handheld devices or tablets, a user changing the orientation of the display.

The viewport 410 may present one or more data item containers 420, each representing one or more data items to the user. The data item containers 420 may each have a parallel container dimension (PAR) 422 describing a measured length of the data item container 420 that is in the same direction as the viewport dimension 412. Thus, if the viewport dimension 412 is a horizontal dimension, the parallel container dimension 422 is also a horizontal dimension. If the viewport dimension 412 is a vertical dimension, the parallel container dimension 422 is also a vertical dimension. The data item containers 420 may additionally have a perpendicular container dimension (PERP) 424 describing a measured length of the data item container 420 that is orthogonal to the viewport dimension 412. Thus, if the viewport dimension 412 is a horizontal dimension, the perpendicular container dimension 424 is a vertical dimension. If the viewport dimension 412 is a vertical dimension, the perpendicular container dimension 424 is a horizontal dimension.

The content aggregation application may determine a viewport dimension 412 for the viewport 410 of a user interface 400. The content aggregation application may set a parallel container dimension 422 for each data item container 420 in a parallel container line based on the viewport dimension 412 so that the parallel container line fills the viewport 410. A parallel container line is a line of data item containers 420 in the same direction as the viewport dimension 412. For example, if the viewport dimension 412 is a horizontal dimension, the parallel container line is a row. If the viewport dimension 412 is a vertical dimension, the parallel container line is a column. Similarly, a perpendicular container line is a line of data item containers 420 in an orthogonal direction to the viewport dimension 412. For example, if the viewport dimension 412 is a horizontal dimension, the perpendicular container line is a column. If the viewport dimension 412 is a vertical dimension, the perpendicular container line is a row. The content aggregation application may arrange a container set of the data item containers 420 in a container layout based on the viewport dimension 412.

The content aggregation application may have a fixed container number mandating a specific number of containers in a parallel container line, with each container having a parallel container dimension adjusted so that the parallel container line completely occupies the viewport. The content aggregation application may set each member of the container set in the parallel container line to have the same parallel container dimension 422. The content aggregation application may vary a member parallel container dimension 422 for members of the container set within a parallel container line.

Alternately, the content aggregation application may have a container maxima setting an upper bound for the number of containers in the parallel container line. The content aggregation application may place as many members of the container set into the parallel container line as may fit in the line up to the container maxima setting. The content aggregation application may set each member of the container set in the parallel container line to have the same parallel container dimension 422. The content aggregation application may vary a member parallel container dimension 422 for members of the container set within a parallel container line.

Otherwise, the content aggregation application may place one or more containers in the parallel container line until the parallel container line completely occupies the viewport 410. The content aggregation application may place as many members of the container set into the parallel container line as may fit in the line. The content set may have a parallel container dimension minima setting a lower bound, usually based on legibility concerns. The content aggregation application may set each member of the container set in the parallel container line to have the same parallel container dimension. Alternately, the content aggregation application may vary a member parallel container dimension 422 for members of the container set within a parallel container line.

The content aggregation application may adjust a member perpendicular container dimension 424 for members of the container set to completely fill the viewport 410 along a viewport dimension orthogonal to the other measured viewport dimension 412. For example, when the initial viewport measurement was a horizontal dimension, the content aggregation may further consider vertical dimensions of the viewport 410. The content aggregation application may vary a member perpendicular container dimension for members of the container set. To ease the arrangement of the member containers, the perpendicular container dimension may vary by multiples, with some containers being twice the perpendicular container dimension plus a margin of other member containers. The content aggregation application may select a media presentation for the data item container 420 based on a perpendicular container dimension 424. For these larger member containers, a richer summary of the data item may be used. For example, in addition to the title, the large data item container 420 may have an abstract of the data item, or even a media object selected from the data item as representative of the data item. The content aggregation application may vary a media presentation for members of the container set. The content aggregation application may select a data item container 420 to have a richer summary of content based on the content present in the original data item. For example, the content aggregation application may give a data item having an embedded video file the larger data container item 420.

Figure 5:
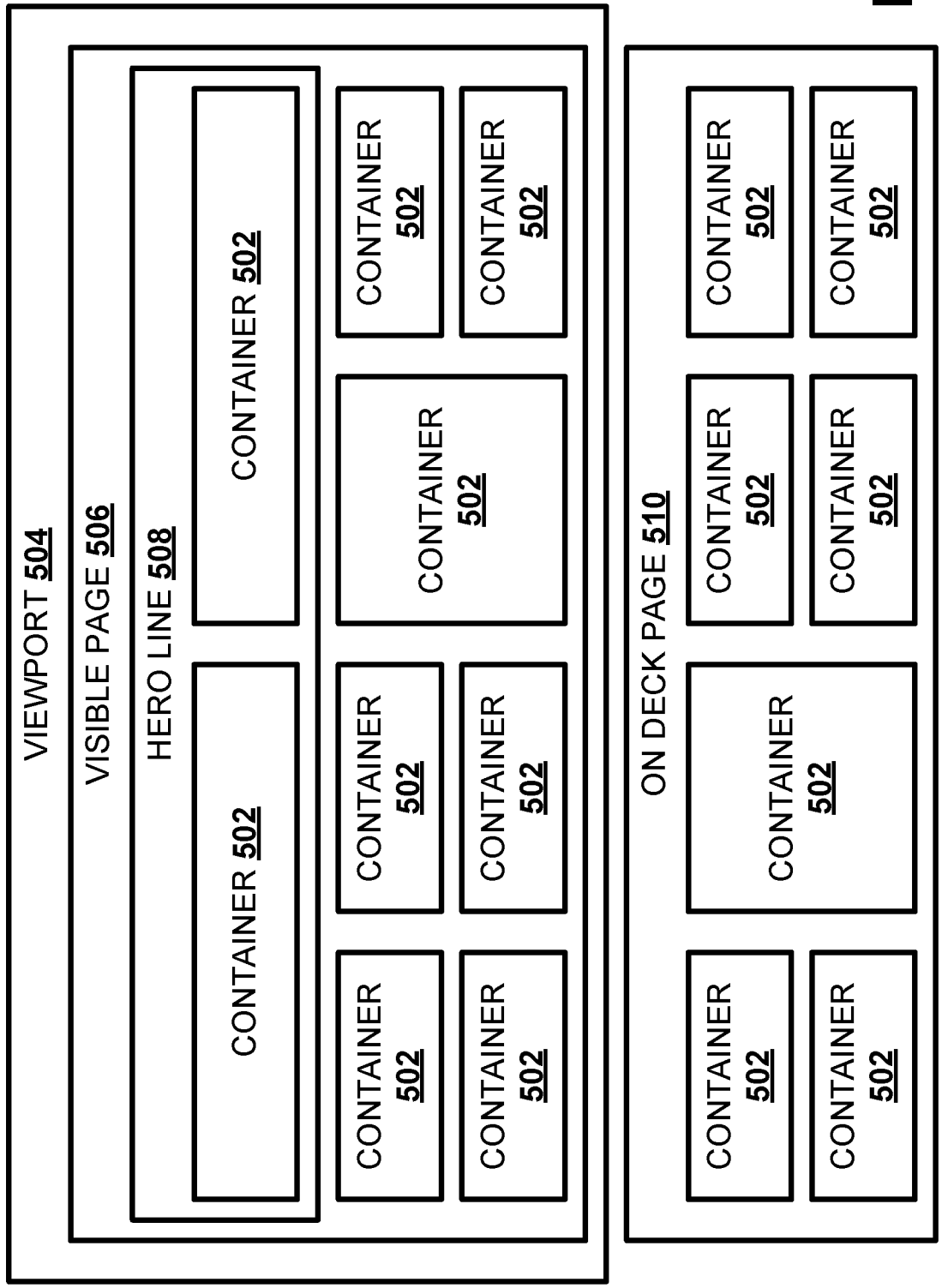
FIG. 5 illustrates, in a block diagram, one embodiment of a container set.

FIG. 5 illustrates, in a block diagram, one embodiment of a container set 500. The container set 500 may have more data item containers 502 than may fit on the viewport 504. The data items containers 502 in the container layout present in the viewport 504 may be a visible page 506 of the container set 500. The content aggregation application may arrange the visible page 506 into a visible container layout based on a viewport dimension of the viewport. The visible page 506 may have a hero container line 508, such as a hero container row, in the container layout having fewer data item containers than subsequent container lines in the visible page 506. The content aggregation application may use the hero container line 508 to focus the attention of the user on specific data items by featuring the data item containers 502 for those data items in the hero container line 508.

The user may scroll the viewport beyond the visible page 506 to see other data item containers 502 in the container set 500. The user may scroll vertically, horizontally, or even a combination of the two. The content aggregation application may arrange an on-deck page 510 of the container set 500 into an on-deck container layout based on a viewport dimension of the viewport. The content aggregation application may apportion an equal or equivalent page area for the visible page 506 and the on-desk page 510 of the container set 500. The content aggregation application may transition the on-deck page 510 to a visible position in the viewport 502, replacing the visible page 506. As the on-deck page 510 becomes the visible page 506, the content aggregation application may create a replacement on-deck page 510. The content aggregation application may keep the data item containers 502 in the hero container line 508 or may select replacement data container items 502 for the hero container line 508 from the on-deck page 510.

Figure 6:
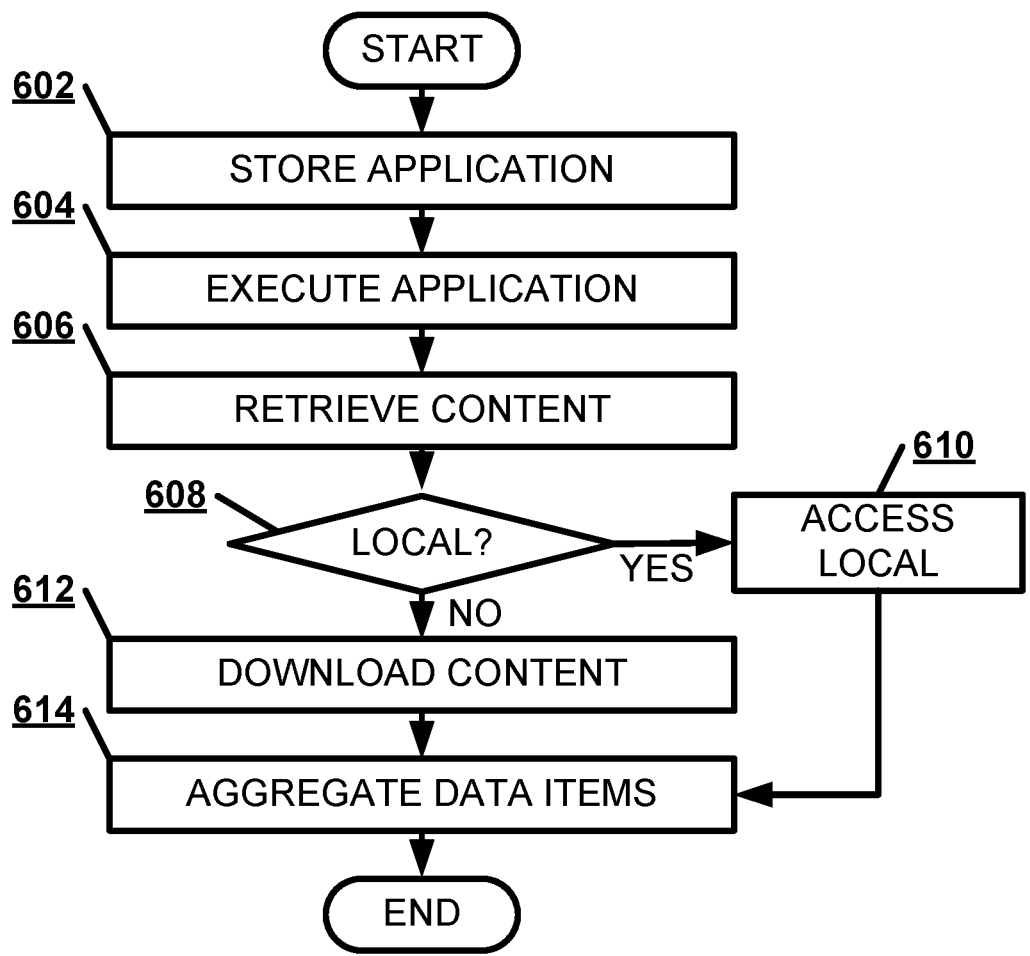
FIG. 6 illustrates, in a flowchart, one embodiment of a method of aggregating content.

FIG. 6 illustrates, in a flowchart, one embodiment of a method 600 of aggregating content. A content aggregation viewer may store a series of instructions to execute a content aggregation application having a user interface to present a data item set to a user (Block 602). The content aggregation viewer may execute the content aggregation application having a user interface to present a data item set to a user (Block 604). The content aggregation viewer may retrieve digital content for presentation to the user (Block 606). If the digital content is stored locally (Block 608), the content aggregation viewer may access a local data storage to retrieve a local content item (Block 610). If the digital content is stored on a network (Block 608), the content aggregation viewer may access a network content file from a network content source (Block 612). The content aggregation viewer may aggregate the data items into a data item set for presentation to a user (Block 614).

Figure 7:
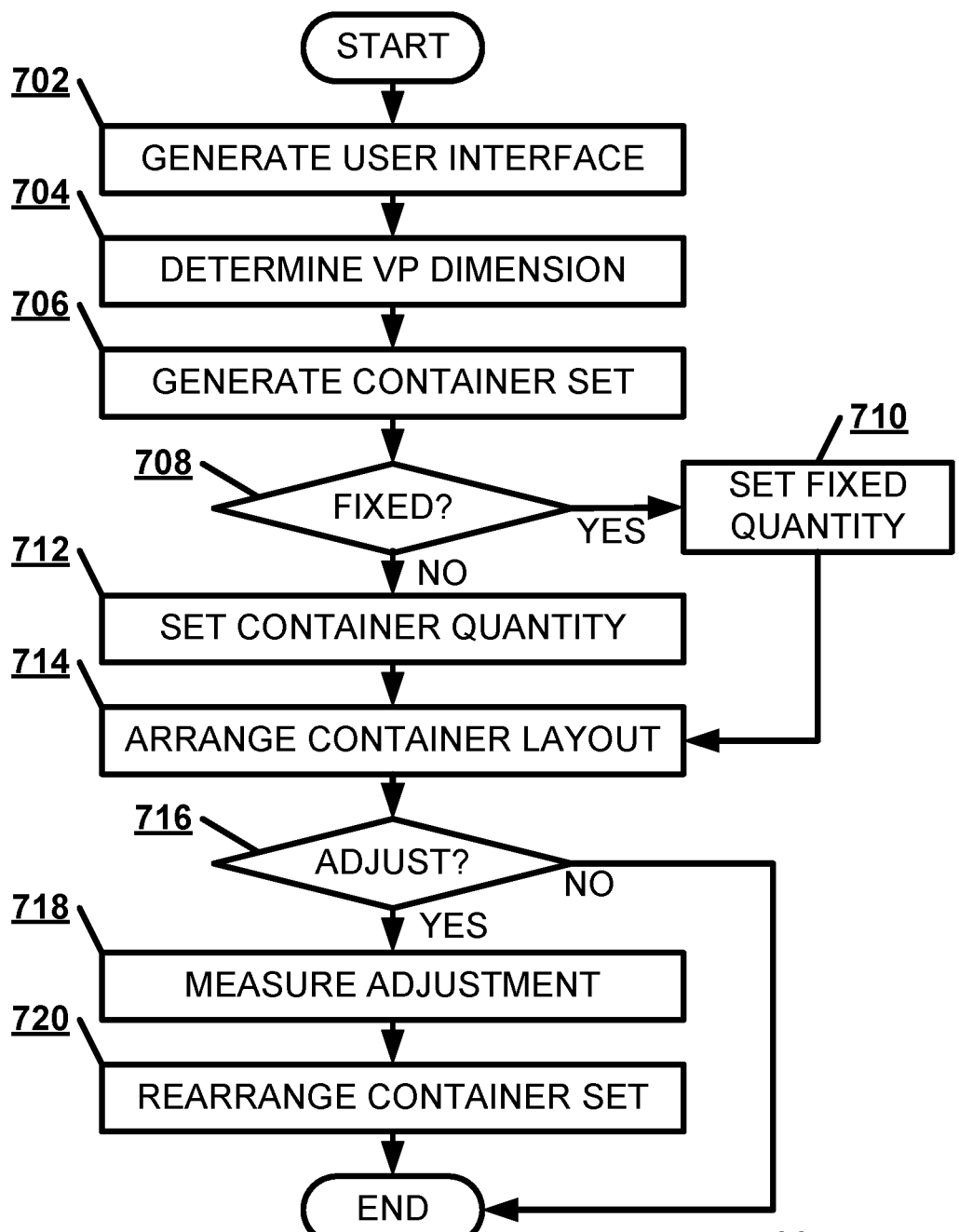
FIG. 7 illustrates, in a flowchart, one embodiment of a method of generating a container layout.

FIG. 7 illustrates, in a flowchart, one embodiment of a method 700 of generating a container layout. The content aggregation viewer may generate a user interface of a content aggregation application to present a data item set to a user (Block 702). The content aggregation viewer may determine a viewport dimension, such as a viewport horizontal length or a viewport vertical length, for a viewport of the user interface of the content aggregation application to present the data item set to the user (Block 704). The content aggregation viewer may generate a container set to summarize the data item set for the user to be arranged in a container layout (Block 706). If the user has indicated a preference for a specific number of containers per line (Block 708), the content aggregation viewer may set a fixed container quantity for a parallel container line of the container set matching a direction of the viewport dimension (Block 710). Otherwise, the content aggregation viewer may set a parallel container line quantity based on the viewport dimension (Block 712). The content aggregation viewer may arrange the container set summarizing the data item set in a container layout based on the viewport dimension, such as the viewport horizontal length or the viewport vertical length (Block 714). If the content aggregation viewer adjusts the viewport dimension, either due to a user input or a change to the orientation of the display of the content aggregation viewer (Block 716), the content aggregation viewer may measure an adjustment to the viewport dimension for the viewport (Block 718). The content aggregation viewer may rearrange the container set into a subsequent container layout based on the adjustment (Block 720).

Figure 8:
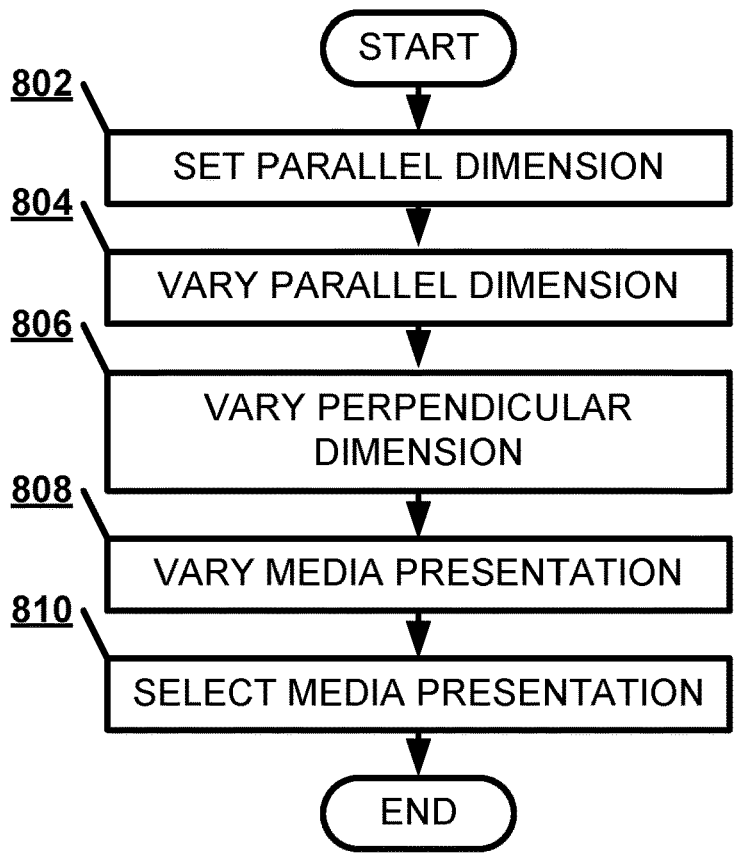
FIG. 8 illustrates, in a flowchart, one embodiment of a method of arranging data item containers.

FIG. 8 illustrates, in a flowchart, one embodiment of a method 800 of arranging data item containers. The content aggregation viewer may set a parallel container dimension of a data item container of the container set having a variable dimension size in a direction of the viewport dimension based on the viewport dimension (Block 802). For example, the content aggregation viewer may set a container horizontal length of a data item container of the container set having a variable horizontal length based on the viewport horizontal length. Alternately, the content aggregation viewer may set a container vertical length of a data item container of the container set having a variable vertical length based on the viewport vertical length. The content aggregation viewer may vary a member parallel container dimension in the direction of the viewport dimension for members of the container set within a parallel container line in the direction of the viewport dimension (Block 804). The content aggregation viewer may vary a member parallel container dimension orthogonal to the direction of the viewport dimension for members of the container set (Block 806). The content aggregation viewer may vary a media presentation for members of the container set (Block 808). The content aggregation viewer may select a media presentation for the data item container based on a parallel container dimension of the data item container orthogonal to the direction of the viewport dimension (Block 810).

Figure 9:
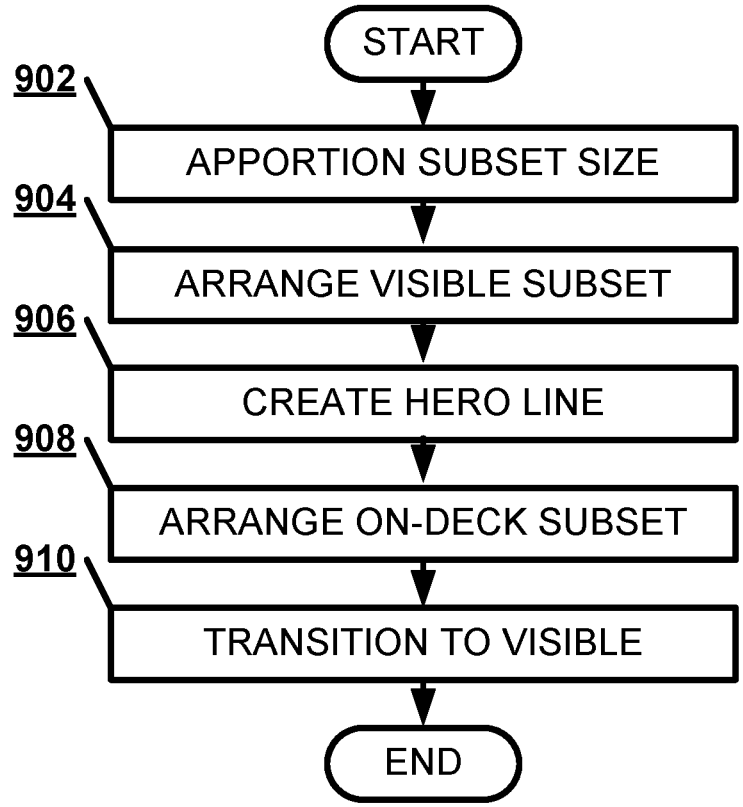
FIG. 9 illustrates, in a flowchart, one embodiment of a method of cycling through a container set.

FIG. 9 illustrates, in a flowchart, one embodiment of a method 900 of cycling through a container set. The content aggregation viewer may apportion an equal or equivalent page area for a visible page representing visible members of the container set present in the viewport and an on-deck page representing on-deck members of the container set about to be present in the viewport (Block 902). The content aggregation viewer may arrange a visible page representing visible members of the container set present in the viewport into a visible container layout based on the viewport dimension (Block 904). The content aggregation viewer may create a hero container line, such as a hero container row or a hero container column, in the container layout having fewer data item containers than subsequent container lines in the container layout (Block 906). The content aggregation viewer may arrange an on-deck page representing on-deck members of the container set about to be present in the viewport into an on-deck container layout based on the viewport dimension, such as a viewport horizontal length or a viewport vertical length (Block 908). The content aggregation viewer may transition the on-deck page representing on-deck members of the container set about to be present in the viewport to a visible position (Block 910).

Figure 10:
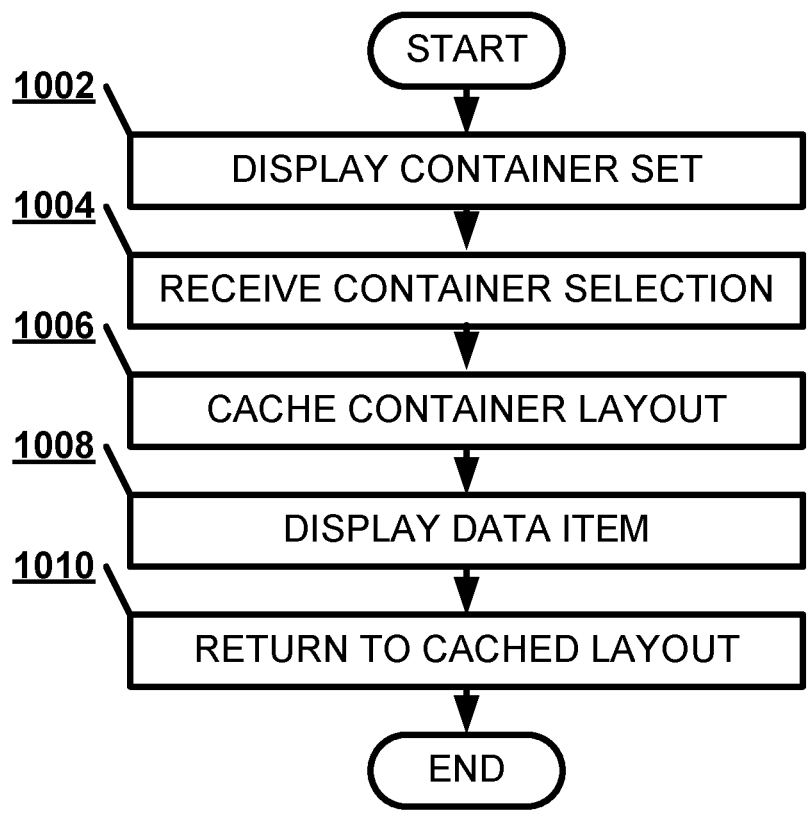
FIG. 10 illustrates, in a flowchart, one embodiment of a method of viewing a data item.

FIG. 10 illustrates, in a flowchart, one embodiment of a method 1000 of viewing a data item. The content aggregation viewer may display the container set in the container layout to the user (Block 1002). The content aggregation viewer may receive a data item container selection from a user (Block 1004). The content aggregation viewer may cache the container layout prior to viewing a data item represented by a selected data item container (Block 1006). The content aggregation viewer may display the data item represented by the selected data item container (Block 1008). The content aggregation viewer may return to the cached container layout when the user finishes viewing the data item (Block 1010).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A client device, comprising:
   a processing core having at least one processor configured to determine a viewport dimension for a viewport of a user interface of a content aggregation application to present a data item set to a user, configured to automatically arrange a container set summarizing the data item set in a container layout based on the viewport dimension, configured to set a parallel container dimension of a data item container of the container set having a variable dimension size in a direction of the viewport dimension based on the viewport dimension, and configured to create a hero container line in the container layout having fewer data item containers than subsequent container lines in the container layout; and
   a display configured to present the container set in the container layout to the user.

2. The client device of claim 1, wherein the processing core is configured to set a container line quantity based on the viewport dimension.

3. The client device of claim 1, wherein the processing core is configured to set a fixed container quantity for a parallel container line of the container set matching a direction of the viewport dimension.

4. The client device of claim 1, wherein the processing core is configured to vary a member parallel container dimension in the direction of the viewport dimension for members of the container set within a parallel container line in the direction of the viewport dimension.

5. The client device of claim 1, wherein the processing core is configured to vary a perpendicular container dimension orthogonal to the direction of the viewport dimension for members of the container set.

6. The client device of claim 1, wherein the processing core is configured to select a media presentation for the data item container based on a perpendicular container dimension of the data item container orthogonal to the direction of the viewport dimension.

7. The client device of claim 1, wherein the processing core is configured to vary a media presentation for members of the container set.

8. The client device of claim 1, wherein the processing core is configured to apportion an equal page area for a visible page representing visible members of the container set present in the viewport and an on-deck page representing on-deck members of the container set about to be present in the viewport.

9. The client device of claim 1, wherein the processing core is configured to arrange a visible page representing visible members of the container set present in the viewport into a visible container layout based on the viewport dimension.

10. The client device of claim 1, wherein the processing core is configured to arrange an on-deck page based on the viewport horizontal length, the on-deck page representing on-deck members of the container set about to be present in the viewport.

11. The client device of claim 1, further comprising:
a user input configured to receive an adjustment of the viewport dimension for the viewport causing the processing core to rearrange the container set into a subsequent container layout based on the adjustment.

12. The client device of claim 1, further comprising:
a memory configured to cache the container layout prior to viewing a data item represented by a selected data item container.

13. The client device of claim 1, wherein the processing core is configured to arrange an on-deck page into an on-deck container layout based upon the viewport dimension, the on-deck page representing members of the container set about to be present in the viewport.

14. The client device of claim 13, wherein the processing core is configured to transition the on-deck page to a visible position replacing a visible page and create a replacement on-deck page when the on-deck page is transitioned to the visible position.

15. A client computing device, having a memory configured to store a series of instructions to execute a content aggregation application having a user interface to present a data item set to a user, the client computing device configured to determine a viewport horizontal length for a viewport of the user interface, the client computing device further configured to automatically arrange a container set summarizing the data item set in a container layout based on the viewport horizontal length, the client computing device also configured to set a container horizontal length of a data item container of the container set having a variable horizontal length based on the viewport horizontal length;
the client computing device additionally configured to create a hero container line in the container layout having fewer data item containers than subsequent container lines in the container layout.

16. The client computing device of claim 15, wherein the client computing device is further configured to arrange an on-deck page based on the viewport horizontal length.

17. The client computing device of claim 15, wherein the client computing device is further configured to cache the container layout prior to viewing a data item represented by a selected data item container.

18. The client computing device of claim 15, wherein the client computing device is further configured to:
arrange an on-deck page into an on-deck container layout based upon a viewport dimension, the on-deck page representing members of the container set about to be present in the viewport;
transition the on-deck page to a visible position replacing a visible page; and create a replacement on-deck page when the on-deck page is transitioned to the visible position.

19. A machine-implemented method, comprising, at a client device:
determining a viewport dimension for a viewport of a user interface of a content aggregation application to present a data item set to a user;
arranging automatically a container set summarizing the data item set in a container layout based on the viewport dimension;
varying a member parallel container dimension in the direction of the viewport dimension for members of the container set within a parallel container line in the direction of the viewport dimension;
varying a member perpendicular container dimension orthogonal to the direction of the viewport dimension for members of the container set;
setting a parallel container dimension of a data item container of the container set having a variable dimension size in a direction of the viewport dimension based on the viewport dimension;
creating a hero container line in the container layout having fewer data item containers than subsequent container lines in the container layout; and
displaying the container set in the container layout to the user.

20. The method of claim 19, further comprising:
varying a media presentation for members of the container set.

* * * * *